(12) United States Patent
Baentsch et al.

(10) Patent No.: US 7,844,082 B2
(45) Date of Patent: Nov. 30, 2010

(54) METHOD AND SYSTEM FOR BIOMETRIC AUTHENTICATION

(75) Inventors: Michael Baentsch, Gross (CH); Peter Buhler, Horgen (CH); Christopher Mark Kenyon, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/644,573

(22) Filed: Dec. 22, 2006

(65) Prior Publication Data

US 2007/0165911 A1 Jul. 19, 2007

(30) Foreign Application Priority Data

Dec. 23, 2005 (EP) ................................ 05112898

(51) Int. Cl.
*G06K 9/00* (2006.01)

(52) U.S. Cl. ..................... 382/115; 713/186; 713/185

(58) Field of Classification Search ................ 382/115; 713/186, 185, 172, 182
See application file for complete search history.

(56) References Cited

U.S. PATENT DOCUMENTS 6,311,272 B1 * 10/2001 Gressel ........................ 713/186
2002/0174344 A1 * 11/2002 Ting ............................ 713/185

* cited by examiner

*Primary Examiner*—Samir A. Ahmed
*Assistant Examiner*—Ruiping Li
(74) *Attorney, Agent, or Firm*—Kenneth R. Corsello; Anne Vachon Dougherty

(57) ABSTRACT

A method for authentication by biometric data, including receiving a biometric data set; evaluating if the received biometric data set is within a reference region, wherein the reference region represents a region associated with a reference biometric data set; evaluating if the received biometric data set is within a blackout region, wherein the blackout region represents a region associated with at least one previously received and positively authenticated biometric data set; and issuing a positive authentication if the received biometric data set is within the reference region, but outside the blackout region.

20 Claims, 4 Drawing Sheets

Fig. 4
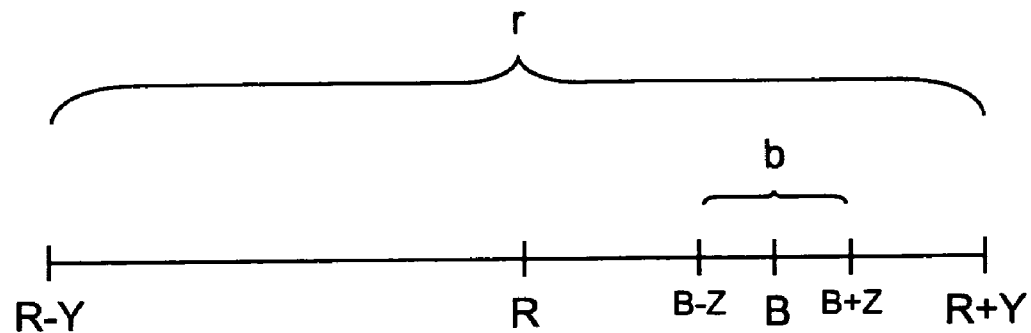
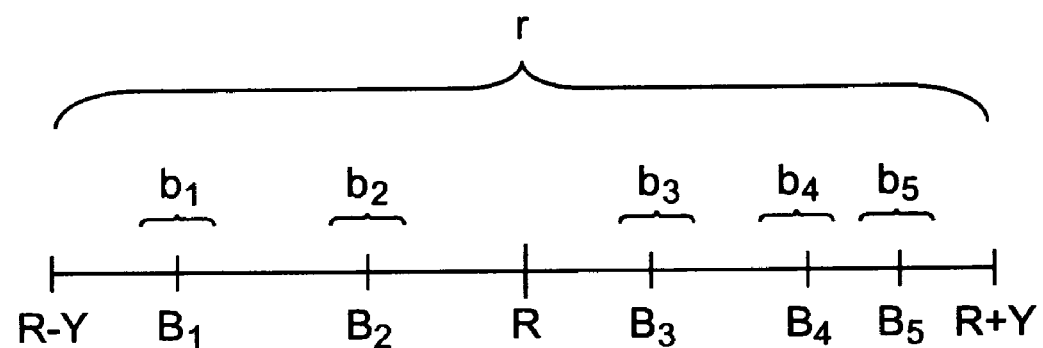
Fig. 5

METHOD AND SYSTEM FOR BIOMETRIC AUTHENTICATION

TECHNICAL FIELD

The present invention is related to a method, a system and an electronic token for biometric authentication.

BACKGROUND OF THE INVENTION

In order to enhance the security of authentication systems, biometric methods are increasingly being deployed to validate the authenticity of users that want to access systems or other protected environments. By means of such biometric methods, the identity of a person is not only tied to something a person knows, e.g. a password or PIN, or something a person has, e.g. a smart card, but also to something a person is. Typical biometric technologies encompass among others fingerprint recognition, hand recognition, face recognition, voice recognition and signature recognition. Usually, a user or person is enrolled to the biometric system by capturing samples of the respective biometry. In the case of fingerprint verification, for example, this requires the scanning of the fingerprints of a user. This is often called template generation. This enrollment data is then stored someplace and used as reference data for later verification.

Common biometric systems store this reference data on servers so that authentication requests can be fielded from any connected computer system. In such systems the scanned biometric data is sent to the server for matching purposes. If sufficient similarity between the enrolled reference data and the submitted scan is detected, access is granted, e.g. to IT-systems (logical security) or buildings (physical security).

Due to privacy concerns, increasingly more biometric technology providers are moving their matching engines closer to the user, away from the servers. In the ideal scenario, the matching is performed totally under control of the user. However, in order to ensure that no bogus biometric authentications occurs, e.g., initiated by attackers providing false biometrics to the system in order to gain unauthorized access to some systems or buildings, the user-centric matching must be sufficiently secured from tampering. This is achieved by bringing the biometric match engines onto secure hardware tokens that cannot be altered by their users. Typically, smart cards are employed for this purpose. In this case, the user is enrolled in a controlled environment, e.g., a passport issuing office, the biometric reference data are stored on a smart card together with some machine-readable credentials that ascertain later as to the authenticity of the card. Typically, public key technology is employed to this purpose. Other means, such as shared secrets, may also be utilized. After enrollment and personalization of the card, the card is handed to the user who may then use it later for authentication attempts to logical or physically protected environments, e.g., at border crossings. The process of access then proceeds as follows: The user approaches a scanner for a supported biometric, presents the security token and has his or her biometric scanned. Then the biometric data are sent to the card, which performs the matching locally inside of the card. If this process has been concluded successfully (a match occurred, i.e., sufficient similarity between the stored biometric reference data and the newly presented biometric data has been confirmed), the machine-readable authentication means, e.g., the shared secret or the private key are activated for use with the system to-be-authenticated-to. If the smart card does not determine a biometric match, it will refuse to authenticate to the system, and access will be refused for the bearer of the card (who may be not the legitimate owner). Thus, the same purposes as with a server-based biometric matching system are achieved, but with the difference that the biometric data of the user do not leave his immediate vicinity.

It is an object of the invention to provide improved solutions for biometric authentication, in particular solutions with enhanced security.

SUMMARY AND ADVANTAGES OF THE INVENTION

The present invention is directed to a method, systems and an electronic token. Further embodiments of the invention are provided in the appended dependent claims.

According to one aspect of the present invention, there is presented a method for authentication by means of biometric data, the method comprising the steps of:

receiving a biometric data set;
  evaluating if the received biometric data set is within a reference region, wherein the reference region represents a region associated with a reference biometric data set;
  evaluating if the received biometric data set is within a blackout region, wherein the blackout region represents a region associated with at least one blackout biometric data set that was previously received and positively authenticated; and
  issuing a positive authentication if the received biometric data set is within the reference region, but outside the blackout region.

According to this aspect of the present invention a positive authentication requires on the one hand that the received biometric data is within a reference region. The reference region is associated with a reference biometric data set. The reference biometric data set may be e.g. the original biometric data of a user which have been presented by the user as a reference when he enrolls to an authentication system. The reference biometric data set might also be captured from several samples of the respective biometry of the user and then derived from these samples e.g. by calculating the average values of these samples. The reference biometric data set is stored somewhere in the authentication system or on an electronic token in order to be available as a reference for authentication attempts of the user. Associated with the reference biometric data set is a reference region. This reference region can be defined e.g. by designers of the respective authentication system or the authority of the respective authentication system. The reference region comprises the area of biometric data that are considered to match with the reference biometric data set good enough. In other words, it comprises all biometric data sets that have an acceptable deviation from the reference biometric data set. When reading or scanning biometric data of a user there are always some deviations from the reference biometric data set, e.g. due to slight natural changes of the biometric identity itself or due to deviations caused by the authentication itself such as scanning deviations. The system designer or owner of the authentication system may set specific threshold for deviations that are considered to be acceptable and thereby defining the reference region.

On the other hand a positive authentication is only granted if the received biometric data set is not within a blackout region. The blackout region is associated with at least one blackout biometric data set that was previously received and positively authenticated. In other words, it is associated with a biometric data set of a previous, preferably the last successful, authentication attempt of the respective user. The blackout biometric data set is stored somewhere in the authentication system or on an electronic token as well in order to be available for following authentication attempts of the user. Preferably the blackout biometric data set and hence the blackout region is updated with each positive authentication attempt. Associated with the blackout biometric data set is a blackout region. The scope of this blackout region can be defined e.g. by designers of the respective authentication system or the authority of the respective authentication system. The blackout region comprises the area of biometric data that are considered to match with the blackout biometric data set so well that a replay attack of the respective user is indicated or suspected respectively. In other words, it comprises all biometric data sets that are considered to be too close to a previously presented and positively authenticated biometric data set. The system designer or owner of the authentication system may set a specific threshold for the required similarity that is considered to be indicative of a replay attack and thereby defining the blackout region or the borders of the blackout region respectively. In a simple version, the blackout region may only comprise one blackout biometric data set. Then a replay attack is only detected in case of an exact match between a current authentication attempt and the previous positive authentication attempt.

If the received biometric data set is within the reference region, but also inside the blackout region, a negative authentication is issued. This could be e.g. denying access to a building or an IT-network, while upon positive authentication the access is granted.

The presented method according to this aspect of the invention prevents that an attacker who has gained access to the data of the reference biometric data set can authenticate himself to the authentication system by presenting this data again. Generally, the authentication system observes the whole blackout region. This means that not only attacks that present exactly the same data of a previous authentication attempt are detected, but also attacks that present slightly different biometric data sets to the system. In general slight deviations will be already inherently caused by the authentication system, e.g. due to scanning deviations. Hence this method is capable of preventing replay attacks towards biometric authentication systems in an efficient, flexible and reliable way. The parameters and thresholds of the reference region and the blackout region can be adapted to the specific application in a flexible way.

The invention takes advantage of the property of any biometric matching algorithm, namely that a user's biometrics is not 100% identically captured. The match algorithms for any biometry are working heuristically, i.e., accept matches within a "band of similarity" that is differently broad for each biometry used. Perfectly identical matches can be ruled out, as for example, a fingerprint image depends on the lighting, the age of the finger, the pressure applied during scanning, and various further factors. In addition very close matches can be considered to be indicative of a replay attack.

According to a preferred embodiment of this aspect of the invention the reference biometric data set is derived from at least two previously received and positively authenticated biometric data sets.

This preferred embodiment allows a dynamic and permanent calibration of the reference biometric data set. The reference biometric data set can be automatically adapted and updated. This is in particular useful for biometric identities that change rather significantly over time. In general, most of the biometrics of a user change over time and with this preferred embodiment the reference region dynamically changes to follow suit.

According to another preferred embodiment of this aspect of the invention a first probability threshold is set for the reference region and a second probability threshold is set for the blackout region, wherein the first probability threshold indicates the probability that a random scan of a true biometric identity is within the reference region and the second probability threshold indicates the probability that a random scan of a true biometric identity is outside the blackout region.

The designers or owners of authentication systems can preferably use statistical methods to design such systems. The first probability threshold indicates the probability that a random scan of a true biometric identity is within the reference region. In other words, it indicates the probability that, if a true and authorized user presents his biometrics for authentication, the scanned and received respectively biometric data are within the reference region. The higher the threshold is set, the greater the reference region will be.

The second probability threshold indicates the probability that a random scan of a true biometric identity is outside the blackout region. In other words, it indicates the probability that, if a true and authorized user presents his biometrics for authentication again after a previous successful authentication attempt, the scanned and received respectively biometric data are outside the blackout regions. In other words, it indicates the probability that a current scan of a true and honest user comprises enough deviations from the previous scan to be outside the blackout region. The higher the threshold is set, the smaller the blackout region will be.

As replay detection is qualitatively different from authentication, it is possible that the system designer would chose different probability thresholds for replay detection as opposed to authentication. As an example, the first probability threshold could be set to 99%, while the second probability could be set to only 95%.

According to a further embodiment of the invention the reference biometric data set and/or the blackout biometric data set are represented by p-parameters.

This allows to reduce the amount of data that has to be stored as reference biometric data set and blackout biometric data set. P is an integer. The p-parameters can be derived by various methods. As an example, in case of fingerprint or eye-scan authentication the scans could be stored as pictures with high resolution. These pictures could represent the blackout biometric data set and reference biometric data set. This would need a lot of memory space. According to this embodiment only a selected number of characteristic parameters would be derived from the fingerprint or eye scan and only these parameters would represent the blackout biometric data set and the reference biometric data set. This saves a lot of memory space. By means of this preferred embodiment multidimensional (p-dimensional) reference and blackout biometric data sets are used.

According to a further embodiment of the invention each parameter comprises the sufficient statistics of the distribution of the reference biometric data set and the blackout biometric data set respectively.

As an example, for the normal distribution the sufficient statistics are the mean and the standard deviation or the variance. Hence each parameter would be represented by the mean and the standard deviation or by the mean and the variance.

As an example, let us suppose that a user enrolls to an authentication system that uses fingerprint data, e.g. in a passport issuing office. Then 5 scans of his fingerprint are taken. From these 5 scans could be derived in a first step the p-characteristic parameters. Then the mean and the standard deviation for each parameter would be calculated. Then for each parameter the mean and the standard deviation is stored According to another preferred embodiment of this aspect of the invention the method further comprises the steps of:
- receiving a series of at least two biometric data sets which correspond to an authentication attempt of the same user;
- evaluating if the received biometric data sets are within the reference region;
- evaluating if the received biometric data sets are within the blackout region;
- issuing a positive authentication if at least two of the received biometric data sets are within the reference region, but outside the blackout region.

This further enhances the probability that replay attacks are detected. For a positive authentication the user has to present at least two biometric data sets to the authentication system. In other words, the scanning of the biometric identity of the user is performed at least twice. In case of two required biometric data sets, these two biometric data sets are evaluated and for a positive authentication both have to be inside the reference region, but outside the blackout region. This preferred embodiment is in particular useful for preventing repeated replay attacks. An adversary might try to defeat the authentication system by repeated presentation of slightly different biometric reference data, e.g. by means of repeated presentation of slightly different biometric tokens or repeated presentation of a biometric from which a biometric token is generated. As an example, an adversary might use a photograph in an attempt to defeat a face recognition system. By bending or stretching the photograph he might present different biometric data to the system in order to avoid being in the blackout region. By means of asking for the presentation of more than one biometric data set, the probability that one of the attempts of such repeated replay attacks falls within the blackout region can be increased significantly.

According to another preferred embodiment of this aspect of the invention the method further comprises the steps of:
- receiving a series of m biometric data sets which correspond to an authentication attempt of the same user, wherein m is a positive integer greater or equal to 2;
- evaluating if the received biometric data sets are within the reference region;
- evaluating if the received biometric data sets are within the blackout region;
- issuing a positive authentication if the proportion of the received biometric data sets that are within the reference region, but outside the blackout region, is above a predetermined threshold.

This enhances the probability that replay attacks are detected. For a positive authentication the user has to present m biometric data sets to the authentication system. The variable m may be set by the system designer in dependence on the specific application. In addition the system designer may set as a threshold a specific proportion of acceptable attempts that have to be within the total number of m attempts. As an example, it could be defined that a user has to present m=5 biometric data sets and more than 3, i.e. at least 4 out of these 5 biometric data sets have to be acceptable, i.e. within the reference region, but outside the blackout region. The threshold in this example would be 3.

According to another preferred embodiment of this aspect of the invention the series of biometric data sets have to be received within a predetermined time in order to get a positive authentication. As an example, it might be requested that 5 biometric data sets must be performed (scanned) within 30 seconds. In addition, 4 out of these 5 biometric data sets have to be acceptable. This further enhances the security of the authentication method.

According to another preferred embodiment of this aspect of the invention the blackout region comprises at least two blackout sub-regions, wherein each blackout sub-region is associated with a previously received and positively authenticated biometric data set.

According to this embodiment the blackout region is associated with at least two previously received and positively authenticated biometric data sets. In other words, there are at least two blackout biometric data sets, each of them associated with a blackout sub-region. This further enhances the reliability and security of the method and is in particular useful to detect and prevent repeated replay attacks. Preferably the blackout biometric data sets are taken from the last positive authentication attempts. The designer may adapt the number dependent on the application. In the design it has to be taken into account that if too many blackout sub-regions are provided or the blackout sub-regions are set too large, the method will not work well anymore.

According to a second aspect of the present invention, there is presented a system for authentication by means of a biometric data set, the system comprising:
- a biometric data receiver for receiving a biometric data set from a user;
- a memory for storing reference biometric data sets corresponding to the users of the authentication system and for storing at least one blackout biometric data set for each user, wherein the blackout biometric data set is a data set of a previous and positively authenticated authentication attempt of the respective user;

wherein the system is provided for
- evaluating if the received biometric data set is within a reference region, wherein the reference regions represent regions associated with the reference biometric data sets of the users;
- evaluating if the received biometric data set is within a blackout region, wherein the blackout regions represent regions associated with the previously received and positively authenticated blackout biometric data sets of the users;
- issuing a positive authentication if the received biometric data set is within one of the reference regions, but outside the corresponding blackout region.

According to this aspect of the present invention the system comprises a memory device that stores a reference biometric data set and at least one blackout biometric data set for each user. The system might be server based, i.e. comprise only one central memory device that might be accessed by individual authentication stations via a network. Alternatively, there might be several distributed memory devices for individual authentication stations. The reference biometric data set has to be presented to the system by the user in an enrollment process. As an example, in case of fingerprint verification, the fingerprints of each user of the system have to be scanned as biometric reference data. Such a system has the advantage that the user can authenticate only by presenting his biometrics like his fingerprint. He does not have to carry any additional authentication elements like smartcards or other electronic tokens.

According to a third aspect of the present invention, there is presented a system for authentication by means of biometric data, the system comprising:
- a biometric data receiver for receiving a biometric data set from a user;

an electronic token reader for reading from an electronic token a reference biometric data set and at least one blackout biometric data set of a previous and positively authenticated authentication attempt of the respective user;

wherein the system is provided for
evaluating if the received biometric data set is within a reference region, wherein the reference region represents a region associated with the reference biometric data set;
checking if the received biometric data set is within a blackout region, wherein the blackout region represents a region associated with the blackout biometric data set; and
issuing a positive authentication if the received biometric data set is within the reference region, but outside the blackout region.

According to this aspect of the invention each user is provided with an individual electronic token that carries the reference biometric data set of the user as well as at least one blackout biometric data set. The reference biometric data set is preferably stored in a controlled environment, e.g. a passport issuing office, on the electronic token. Preferably after such an enrollment process the user cannot alter the stored reference biometric data set anymore. Preferably some machine readable credentials are stored on the electronic token that ascertain later as to the authenticity of the electronic token. Preferably, public key technology can be used for this purpose, but other means, such as shared secrets, can be used as well. After enrollment and personalization of the electronic token it can be handed over to the user who may then use it for later authentication. The blackout biometric data set is usually updated with each new positive authentication attempt of the user. This means, that after a positive authentication the authentication system stores the respective biometric data set in the memory of the electronic token.

The third aspect of the present invention has the advantage that it avoids privacy concerns of the system users. The reference biometric data set as well as the blackout biometric data set are only stored on the electronic token which is in the possession of the user. The authentications system itself does not store these private user data. The danger of data misuse is thereby reduced.

According to a preferred embodiment of the third aspect of the invention the electronic token reader is a smart card reader.

According to a preferred embodiment of the second and the third aspect of the invention the biometric data receiver is an optical scanner.

According to a fourth aspect of the present invention, there is presented an electronic token with biometric authentication function, comprising a memory for storing a reference biometric data set and for at least one blackout biometric data set of a previous authentication attempt that was positively authenticated.

According to this aspect of the invention the electronic token has to have only a memory, but no own processor. This is a very cost effective solution.

According to a fifth aspect of the present invention, there is presented an electronic token with biometric authentication function, comprising a memory for storing a reference biometric data set and for at least one blackout biometric data set of a previous authentication attempt that was positively authenticated. The electronic token comprises an interface for receiving a biometric data set for authentication and a central processing unit for evaluating if the received biometric data set is within a reference region, wherein the reference region represents a region associated with the reference biometric data set. The central processing unit is further provided for evaluating if the received biometric data set is within a blackout region, wherein the blackout region represents a region associated with the blackout biometric data set and for issuing a positive authentication if the received biometric data set is within the reference region, but outside the blackout region.

According to this aspect of the invention the whole evaluation process is performed within the electronic token. This overcomes privacy concerns of users. The electronic token receives the biometric data of a user that wants to authenticate to a protected environment via an interface. As an example, a fingerprint of the user can be scanned by a fingerprint sensor of the authentication system and this fingerprint sensor data is transmitted to the electronic token via the interface. The interface might be a usual interface of a read/write-unit, e.g. of a smart card reader. Another possibility is a wireless interface. After a positive authentication the electronic token activates machine readable authentication means, e.g. a shared secret key or a private key.

According to a preferred embodiment of the fourth and the fifth aspect of the invention the electronic tokens are smart cards. In case of the fourth aspect of the invention, it is a memory card, while in case of the fifth aspect of the invention it is microprocessor card.

Smart cards are increasingly used for authentication purposes. They are a cost effective solution.

DESCRIPTION OF THE DRAWINGS

Preferred embodiments of the invention are described in detail below, by way of example only, with reference to the following schematic drawings.

FIG. 4 shows a reference region and a blackout region of a reference biometric data set and a blackout biometric data set, FIG. 5 shows a reference region and a blackout region of a reference biometric data set and five blackout biometric data sets.

The drawings are provided for illustrative purpose only and do not necessarily represent practical examples of the present invention to scale.

Figure 1:
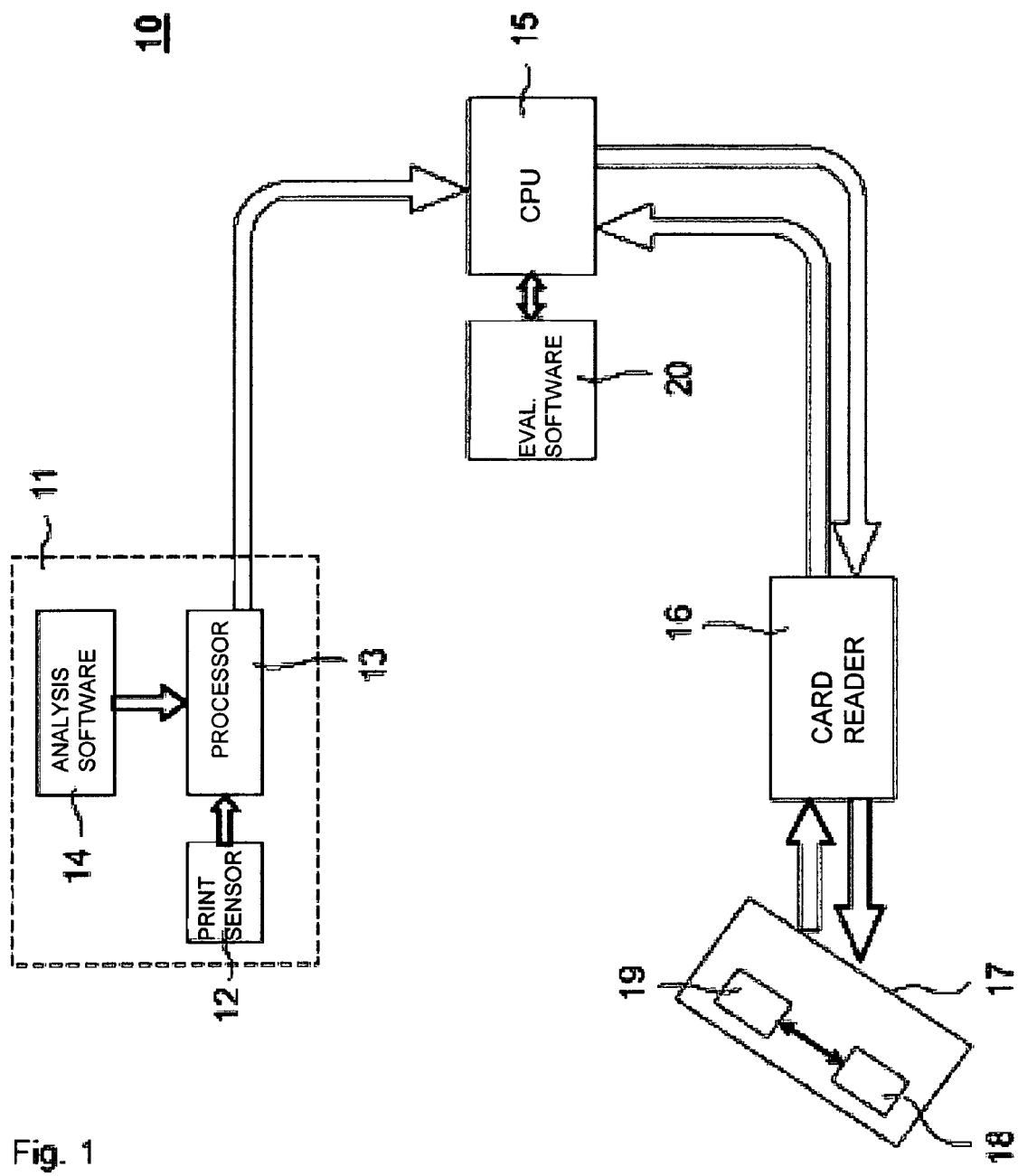
FIG. 1 shows a schematic illustration of a block diagram of an authentication system according to a first embodiment of the invention.

FIG. 1 shows a block diagram that illustrates schematically the function of a biometric authentication system 10 according to a first embodiment of the invention. The biometric authentication system 10 comprises a biometric data receiver 11. The biometric data receiver 11 comprises a fingerprint sensor 12, a biometrics processor 13 and a biometrics analysis software 14 which runs on the biometrics processor 13. The user places his finger on the fingerprint sensor 12, the received sensor data are transmitted to the biometrics processor 13 and are analysed by means of the biometric analysis software 14. As a result, a biometric data set from the fingerprint of the user is transmitted to a central processing unit 15 of the authentication system 10. The authentication system 10 comprises as electronic token reader a smart card reader 16 which is operatively coupled to the central processing unit 15. The smart card reader 16 is provided for reading data from a smart card 17. The smart card 17 comprises a memory 18 and an input/output (I/O)-unit 19. The memory 18 is provided for storing a reference biometric data set. The reference biometric data set comprises a template with reference data of the respective biometrics of the user. In this example the reference biometric data set comprises reference fingerprint data. This reference fingerprint data are preferably written in a controlled environment into the memory 18, e.g. in a passport or smartcard issuing office. The memory 18 is further provided for storing at least one blackout biometric data set. The blackout biometric data set comprises the biometric data of a previous, preferably the latest positive authentication attempt of the user. In dependence on the capacity of the memory 18 the biometric data of the last n positive authentication attempts can be stored as blackout biometric data. With each new positive authentication of the user the blackout biometric data set in the memory 18 is updated.

A user that wants to authenticate to the authentication system 10 has to put his smart card 17 into the smart card reader 16. The smart card reader 16 reads the reference biometric data set as well as the blackout biometric data set from the smart card 17 and transmits these data sets to the central processing unit 15. On the central processing unit 15 runs an evaluation software 20 which evaluates and compares respectively the biometric data set received from the fingerprint sensor 12 with the reference biometric data set and the blackout biometric data set received from the smart card 17. The evaluation software 20 evaluates and checks respectively whether the biometric data set received from the fingerprint sensor 12 is within a reference region and whether it is in a blackout region. The reference region is associated with the reference biometric data set while the blackout region is associated with one or more blackout biometric data sets. The scope or width of the reference region and the blackout region is defined by the designer of the authentication system 10. The reference region comprises the area of biometric data that are considered to match with the reference biometric data set good enough. When reading or scanning biometric data of a user there are always some deviations from the reference biometric data set, e.g. due to slight natural changes of the biometric identity itself and due to deviations caused by the authentication system itself such as scanning deviations. The system designer or owner of the authentication system 10 may set specific threshold for deviations that are considered to be acceptable and thereby defining the reference region. The blackout region comprises the area of biometric data that are considered to match with the blackout biometric data set so well that a replay attack of the respective user is indicated or suspected respectively. In other words, it comprises all biometric data sets that are considered to be too close to a previously presented and positively authenticated biometric data set. The system designer or owner of the authentication system may set a specific threshold for the required similarity that is considered to be indicative of a replay attack and thereby defining the blackout region or the borders of the blackout region respectively.

In a simple version of the authentication system 10 the blackout region may comprise only one blackout biometric data set. In this case a replay attack is only detected if an exact match with a previous authentication attempt occurs.

If the evaluation software 20 comes to the conclusion that the received biometric data set of the fingerprint sensor 12 is within the reference region, but outside the blackout region of the reference biometric data set and the blackout biometric data set received from the smart card 17, a positive authentication is issued. As an example, the user could be granted access to a building or an IT-system.

After the positive authentication the biometric data set received from the fingerprint sensor 12 is sent via the smart card reader 16 into the memory 18 of the smart card 17 and is stored as new blackout biometric data set. If the memory 18 is provided for only storing the biometric data of the last positive authentication attempt as blackout biometric data, the former blackout biometric data set is overwritten. If the memory 18 is provided for storing the biometric data of the last n authentication attempts as blackout biometric data, the oldest blackout biometric data set is overwritten like in a shift register. Subsequently, the user can take his card out of the smart card reader 16 and use it later for another authentication attempt.

If the received biometric data set is within the reference region, but also inside the blackout region, a negative authentication is issued. This could be e.g. denying access to a building or the IT-system. In this case the authentication system 10 assumes that a bogus is performing a replay attack and no blackout biometric data is written to the smart card 17.

Figure 2:
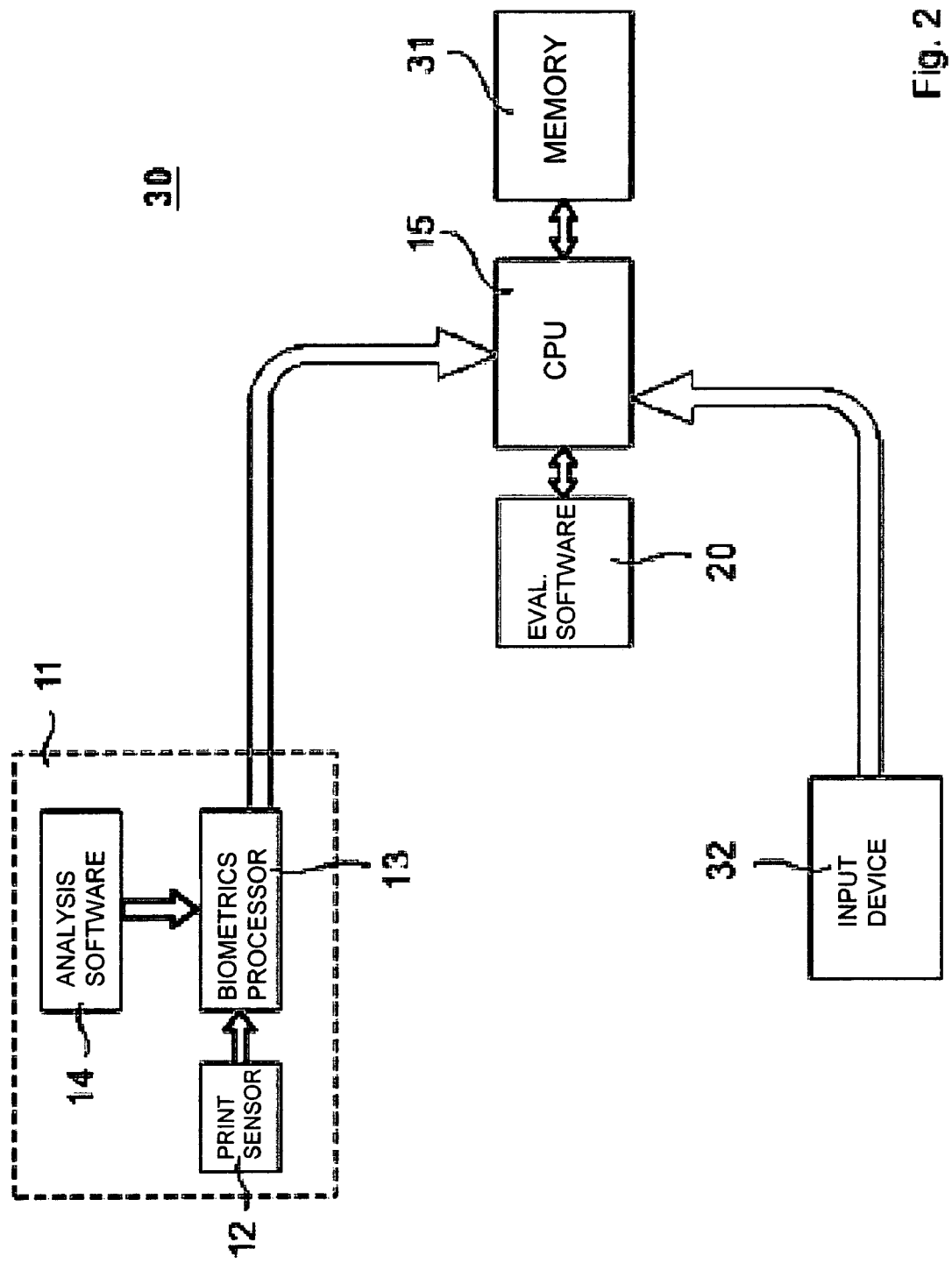
FIG. 2 shows a schematic illustration of a block diagram of an authentication system according to a second embodiment of the invention.

FIG. 2 shows a block diagram that illustrates schematically the function of a biometric authentication system 30 according to a second embodiment of the invention. The parts of the biometric authentication system 30 that are the same or similar to the authentication system 10 of FIG. 1 are denoted with the same reference numerals. Accordingly, the authentication system 30 comprises the biometric data receiver 11, the fingerprint sensor 12, the biometrics processor 13 with the biometric analysis software 14 and the central processing unit 15 with the evaluation software 20 as described with reference to FIG. 1. The central processing unit 15 is operatively coupled with a memory unit 31. The memory unit 31 is provided for storing the reference biometric data sets and one or more blackout biometric data sets for each user that is registered to the authentication system 30. According to this embodiment the reference biometric data set, i.e. the fingerprint data of the true user, have to be provided to the authority that runs the authentication system 30. This means the users have to enroll to this authority and after the enrollment the reference biometric data sets of the enrolled users are stored in the memory unit 31. In order to ensure the privacy of the users, the memory unit 31 has to be protected in an appropriate way. In addition, the blackout biometric data sets of the respective users are stored in the memory unit 31.

A user that wants to authenticate to the authentication system 30 has to put his finger on the fingerprint sensor 12. The central processing unit 15 receives the scanned and analysed biometric data from the biometrics processor 13. The central processing unit 15 evaluates and checks respectively by means of the evaluation software 20 whether the received biometric data is within the reference region of any of the stored reference biometric data sets. If this is the case, i.e. if a corresponding match was found, it is further checked if the received biometric data set is within the corresponding blackout region. In dependence on the result of this evaluation a positive or negative authentication is issued.

The authentication system 30 might comprise in addition an input device 32. The input device 32 might be e.g. a keyboard. The input device 32 is provided for receiving an identity credential of the user that wants to authenticate to the authentication system 30. Such an identity credential might be e.g. a user name, a password, a PIN or a combination of them. The identity credential is stored together with the reference biometric data set in the memory unit 31. This has the advantage that the authentication system 30 does not have to check all reference biometric data sets that are stored in the memory unit 31 for a match with a current scan, but only the reference biometric data set and the blackout biometric data set that correspond to the identity credential of the user that has currently requested an authentication.

Figure 3:
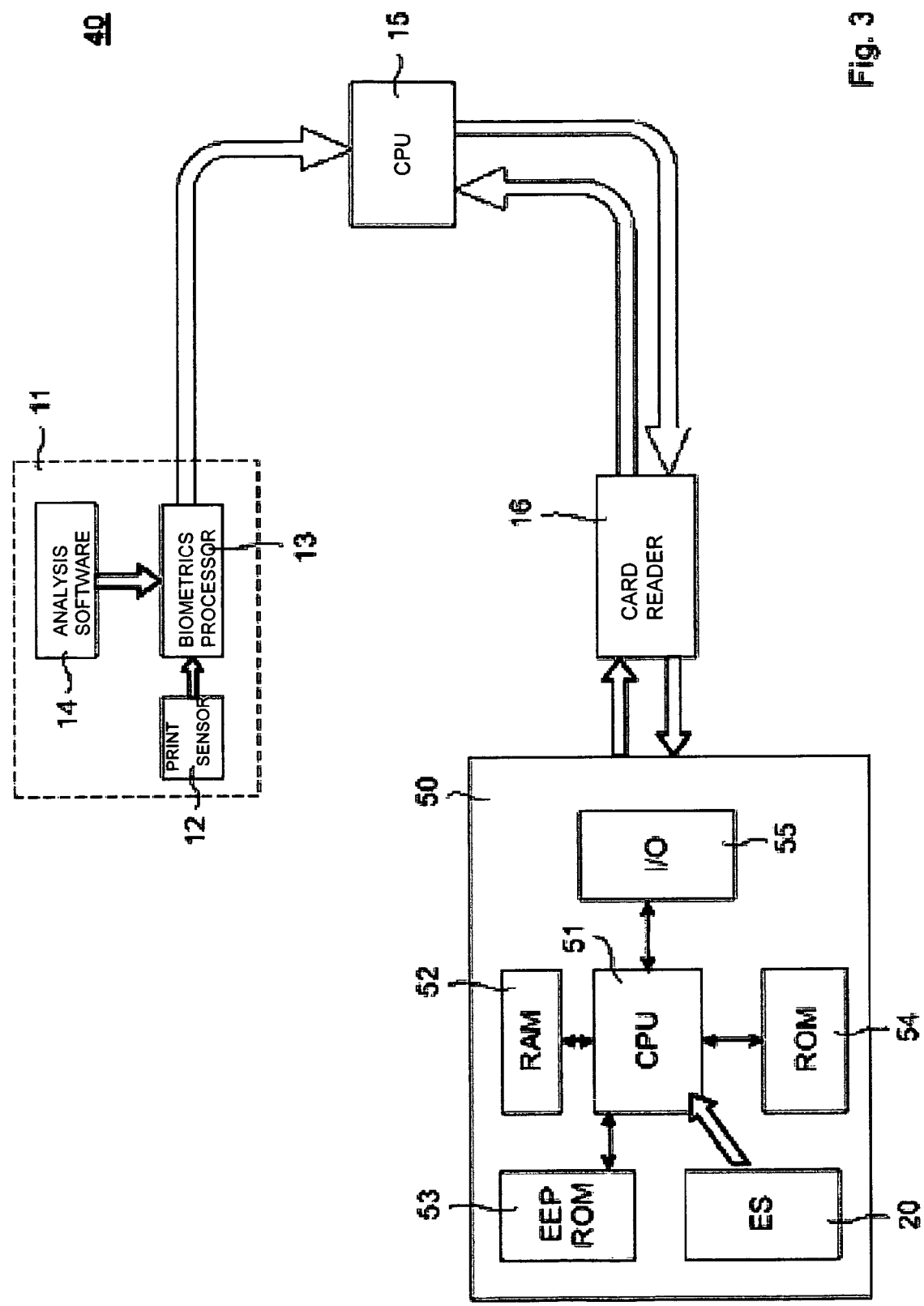
FIG. 3 shows a schematic illustration of a block diagram of an authentication system according to a third embodiment of the invention.

FIG. 3 shows a block diagram that illustrates schematically the function of a biometric authentication system 40 according to a third embodiment of the invention. The parts of the biometric authentication system 40 that are the same or similar to the authentication system 10 of FIG. 1 are denoted with the same reference numerals. Accordingly, the authentication system 40 comprises the biometric data receiver 11, the fingerprint sensor 12, the biometrics processor 13 with the biometric analysis software 14, the central processing unit 15 and the smart card reader 16 as described with reference to FIG. 1.

According to this embodiment the smart card reader 16 is provided to exchange data with a smart card 50. The smart card 50 is more sophisticated than the smart card 17 as shown in FIG. 1. The smart card 50 comprises a central processing unit 51, a random access memory (RAM)-unit 52, an electrically erasable programmable read only memory (EEPROM)-unit 53, a read only memory (ROM)-unit 54 and as interface an input/output (I/O)-unit 55. The EEPROM-unit 53 is provided for storing the reference biometric data set of the owner of the smart card 50. This reference biometric data set is preferably written in a controlled environment into the EEPROM-unit 53, e.g. in a passport or smartcard issuing office. The EEPROM-unit 53 is further provided for storing at least one blackout biometric data set. The blackout biometric data set comprises the biometric data of a previous, preferably the latest positive authentication attempt of the user. In dependence on the capacity of the EEPROM-unit 53 the biometric data of the last n positive authentication attempts can be stored as blackout biometric data. With each new positive authentication of the user the blackout biometric data set stored in the EEPROM-unit 53 may be updated. In addition the smart card 50 comprises the evaluation software 20 which may be stored in the EEPROM-unit 53 as well.

In addition, the EEPROM-unit 53 comprises some credentials that refer to the authenticity of the smart card 60. As an example, public key technology or shared secrets can be used for this purpose.

The authentication process of the authentication system 40 works as follows: The user who wants to authenticate to the authentication system 40 places his finger on the fingerprint sensor 12. In addition, he has to put his smart card 50 into the smart card reader 16. The received sensor data from the fingerprint sensor 12 are transmitted to the biometrics processor 13 and are analysed by means of the biometrics analysis software 14. As a result, the biometric data set from the fingerprint of the user is transmitted via the central processing unit 15 or directly to the smart card reader 16. The smart card reader 16 transmits these sensor data of the fingerprint sensor 12 to the smart card 50.

Then the biometric data set received from the fingerprint sensor 12 is compared with the reference biometric data set and the blackout biometric data set stored on the smart card 50 by means of the evaluation software 20 which runs on the central processing unit 51 of the smart card 50. The evaluation software 20 evaluates and checks respectively whether the biometric data set received from the fingerprint sensor 12 is within the reference region and whether it is in the blackout region.

If the evaluation software 20 comes to the conclusion that the received biometric data set of the fingerprint sensor 12 is within the reference region, but outside the blackout region, a positive authentication is issued. As an example, the user could be granted access to a building or an IT-system.

After the positive authentication the biometric data set received from the fingerprint sensor 12 is stored in the EEPROM-unit 53 as blackout reference data set. If the EEPROM-unit 53 is provided for only storing the biometric data of the last positive authentication attempt, the former blackout reference data set is overwritten. If the EEPROM-unit 53 is provided for storing the biometric data of the last n authentication attempts, the oldest blackout reference data set is overwritten like in a shift register. Subsequently, the user can take his card out of the smart card reader 16 and use it later for another authentication attempt.

This embodiment of the invention has the advantage that the biometric reference data and the blackout biometric data of the user do not leave his immediate vicinity. They are only stored on the smart card 50, but not in the authentication system 40.

FIG. 4 illustrates by way of a very simplified example the terms blackout region and reference region.

Biometric identity is always inexact, so an exact match with a previous authentication attempt indicates a replay attack. However, even an inexact match with a previous authentication attempt can indicate a replay attack.

In the following example it is assumed that the reference biometric data set comprises only a single number R, in the following referred to as reference token R. When the above described authentication systems 10, 20 or 40 are designed, it can be decided by the system designers that acceptable matches, i.e. matches that are within the reference region r, are within an interval of R−Y to R+Y of the reference token R. Y is a number that indicates the maximal deviation from the reference token R that is accepted. The reference region r is then defined to comprise all numbers between R−Y and R+Y. In addition it is assumed that the last positive authentication was performed with a number B. In this example, B is the blackout biometric data set. The system designer may define that a blackout region b comprises all numbers between B−Z and B+Z, wherein Z is a number defining the minimum distance from B that is required to be out of the blackout region b. Note that in general the width of the region around the number R is not required to be symmetric.

The reference token R may be the average of a set of original token captures by the system. For this example, we assume that this is the true average. If it is further assumed that the variation in the biometric read has a standard deviation of $\sigma$ (this may be per person or across the whole population) about the reference token R, and that this is the true standard deviation, then a first probability threshold p1 indicating that a random scan of a true biometric identity is within the reference region r is set at a probability level of $$p1 = 2(1 - \Phi^{-1}(Y/\sigma)),$$

wherein $\Phi^{-1}$ is the inverse Standard Normal cumulative distribution function.

To evaluate if a replay attack occurs, it is assumed that the authentication system stores a previously received and positively authenticated token $B_{-1}$ and the current token to be evaluated is $B_0$.

Then the (two-sided) probability that the current token $B_0$ would be as close as it is observed to be to the previous token $B_{-1}$, if the current token $B_0$ was a random scan, is as follows:

$$p = \Phi^{-1}(((B_{-1} + |B_{-1} - B_0|) - R)/\sigma) - \Phi^{-1}(((B_{-1} - |B_{-1} - B_0|) - R)/\sigma).$$

The system designer may set a second probability threshold p2 indicating the probability that a random scan of a true biometric identity is outside the blackout region b.

This means that if $p<p2$, then the current token $B_0$ is considered to be in the blackout region and hence a replay attack will be detected.

As being within the reference region r is qualitatively different from being within the blackout region b, it is possible that the system designers chose a different probability threshold for p1 as opposed to p2.

Instead of using the fixed reference token R and the standard deviation σ of this reference token R, these may instead be calculated from a store of the last n positively authenticated tokens, with the reference region r defined by the designers in terms of the probability level p1. This then gives the width of the reference region r in terms of sample standard deviations each side of the stored sample average. This has the advantage that as the biometrics of a user changes over time, the reference region r dynamically changes to follow suit. This is not limited to statistics described by the Normal distribution but may be applied to any distribution—including the case of no fixed distribution where the samples are used explicitly as an empirical distribution both for the range of acceptable token values and for the difference distribution. This may be done by a censored or non-censored quantile method depending on whether failed authentication attempts are also stored or not.

This dynamic calibration method has an additional advantage in that it enables online detection of when the replay detection method is failing, i.e. when the real scans are becoming so close together that detection of a replay is impossible.

In general system designers should define the first probability threshold p1 and the second probability threshold p2 corresponding to the probabilities to be in the in the reference region and outside the blackout region. The designers should at a minimum also supply two probability functions, one that gives the probability of a true token being in the reference region when supplied with the true token, Paccept(token), and the second giving the probability of observing the two tokens with which it is supplied (current and previous), i.e. Ptwo (token1, token2). In general the second function will be a function of the current token and a set of previous tokens, i.e. Preplay(current, {previous stored set}).

This method for authentication can also be robust in that if, by chance, a true biometric token that is provided by a true user is taken as a replay attack, i.e. is considered to be in the blackout region b, then the user can simply present this biometric token again and the chances will be high that there will be sufficient natural variation that the biometric token that is presented again is accepted as valid, i.e. is not in the blackout region b anymore. Thus this method for authentication is robust in actual use.

According to a further exemplary embodiment of the invention repeated replay attacks can be prevented as well. A repeated replay attack might be performed by an adversary by means of repeated presentation of slightly different biometric tokens or repeated presentation of a biometric from which a biometric token is generated. For example, an adversary might use a photograph in an attempt to defeat a face recognition system. If an authentication attempt by means of the photograph is detected to be in the blackout region b, the adversary may start to manipulate the photograph so as to generate different biometric data, e.g. by bending it, stretching it etc. With sufficient time—which can be calculated from the statistics of the system and from the statistics of the changes due to manipulation—the replay detection method as described above could be defeated. In order to prevent such a repeated replay attack, this time, or a number of failed scans within a given time, can be used as an indication of a repeated replay attack. One possibility is to define that a positive authentication requires the presentation of a series of m tokens (biometric data sets). A positive authentication is only granted if the proportion of the received tokens that are within the reference region r, but outside the blackout region b, is above a predetermined threshold. In other words, it is looked for a set of acceptable tokens without (or with only a few) detected replay attacks. Unless the adversary discovers exactly how to repeatedly manipulate the biometric token, e.g. the photograph, to generate the same distribution of tokens as the acceptable set then this method prevents repeated replay attacks securely.

According to an embodiment of the present invention replay prevention may be established by storing the last m received tokens whether acceptable or not. Then it is defined that the proportion of acceptable tokens (PropAcceptable) in the last m tokens be above a given threshold (PropAcceptableLimit) within a given time (and, of course, that the last attempt is acceptable—otherwise a failed attempt after a series of acceptable authentications could be interpreted as acceptable).

As an example, it is supposed that an attacker has a false biometric token generator (e.g. a photo) that has mean $\mu_F$ which is in the reference region r,—but also in the blackout region b (i.e. replay detected, e.g. exactly equal to previous token B that was positively authenticated)—and standard deviation $\sigma_F$, whereas the true biometric generates tokens with mean $\mu_T$ and standard deviation $\sigma_T$.

In order to further enhance the security of the authentication system, the blackout region b may be enlarged by defining that the blackout region b represents a region associated with the last n valid scans, i.e. the last n received biometric data sets that were positively authenticated. Then each of the blackout biometric data sets or blackout tokens respectively is associated with a blackout sub-region. The n valid scans define a blackout region where any authentication attempt is labeled immediately as a replay. During the authentication sequence with the m required scans the blackout region will not be changed. In addition it might be requested that e.g. all scans must be done within 30 seconds and there must be a pause of 5 seconds between separate authentication attempts=sequences). The blackout regions will not be updated unless a valid authentication sequence is made.

FIG. 5 illustrates by way of an exemplary embodiment the method to prevent repeated replay attacks. Again it is assumed that the reference biometric data set comprises only a single number R, in the following referred to as reference token R. Acceptable matches, i.e. matches that are in the reference region r, are within an interval of R−Y to R+Y of the reference token R that corresponds to the acceptance probability $p_1$. Y is a number that indicates the maximal deviation from the reference token R that is accepted. The reference region r is then defined to comprise all numbers between R−Y and R+Y. In addition it is assumed that the last n positive authentications were performed with numbers B1, B2, B3, B4 and B5. Correspondingly, 5 blackout sub-regions b1, b2, b3, b4 and b5 are defined which comprise all numbers between B1−Z and B1+Z, B2−Z and B2+Z, B3−Z and B3+Z, B4−Z and B4+Z and B5−Z and B5+Z, wherein Z is a number defining the minimum distance from B1, B2, B3, B4 and B5 that is required to be out of the blackout regions b1, b2, b3, b4 and b5. The 5 blackout sub-regions together form the blackout region b.

In this example the probability of being in the reference region r, but not in the blackout region b when using a biometric token generator G with cumulative distribution $\Psi()$, is $$P(\text{accepted}) = P(\text{reference region}) - P(\text{blackout regions}) = (\Psi^{-1}(R+Y) - \Psi^{-1}(R-Y)) - \Sigma_{i=1}^{i=n}(\Psi^{-1}(a_i^h) - \Psi^{-1}(a_i^l))$$

where the l,h indices indicate the lower and upper bounds on the blackout regions b1, b2, b3, b4 and b5 (i.e. n=5 in the equation above).

Thus, for m attempts using the biometric generator G the probability that an acceptable biometric token, i.e. a token that is within the reference region, but outside the blackout region, is generated is just $P(\text{accepted})(1-P(\text{accepted}))^{m-1}$.

With sufficient m an acceptable biometric token will be generated. Hence if any single acceptable biometric is to be accepted then it m must be set sufficiently low to make the acceptability of falsely-generated acceptables low enough.

Alternatively, instead of insisting on just one acceptable authentication token within m scans, according to another embodiment v acceptable tokens within m scans could be demanded. The chance to duplicate valids, i.e. tokens that are in the reference region r, but outside the blackout region b, in m attempts can be calculated as $C(v,m) P(\text{accept})^v (1-P(\text{accept}))^{m-v}$ where $C(,)$ is the binomial coefficient $m!/(v!(m-v)!)$.

From an attacker's point of view, the optimal attack generator G can be calculated knowing $\sigma_T$ which may indeed be observable from the general population. Thus it would be prudent to assume an optimal attack. Hence the difference between the valid distribution and the distribution generated by the optimal attack generator should be considered. This can be calculated (in the case of Normal distributions) as the difference between the means. This is because a Normal distribution has two sufficient statistics and we assume that one of these, the standard deviation, is compromised hence we must use the other. Thus we deal with acceptance and blackout regions relative to sets of scans. From a set of scans, say n scane, we derive the sufficient statistics of the biometric token distribution and then test against the defined regions. Note that the regions are a multi-dimensional with the number of dimensions being the number of sufficient statistics. In this case it is very important to use small sample statistics because it is unrealistic to expect users to provide large numbers of scans. For example in the case of the Normal distribution a small-sample approximation is the t-Distribution with n−2 degrees of freedom if we are matching on two statistics (n being the number of scans).

An optimal attack using an optimal attack generator consists of using the compromised biometric token to generate others that can then be used as the average and to ensure that the average is exactly maintained in each attack sequence. Whatever the degree of precision of definition of the true mean the defense will eventually be defeated—and in linear time assuming that the attacker knows the degree of precision required. The only defense is to ensure that insufficient time is available to search the entire acceptable token space.

This set of attacks and defenses can be generalized using the sufficient statistics of whatever the actual biometric token is.

The aspects of the invention take advantage of the property of any biometric matching algorithm, namely that a user's biometrics is not 100% identically captured. The match algorithms for any biometry accordingly are working heuristically, i.e., accept matches within a "band of similarity" that is differently broad for each biometry used. Perfectly identical matches can be ruled out, as for example, a fingerprint image depends on the lighting, the age of the finger, the pressure applied during scanning, and various further factors.

The aspects of the invention can be applied to any biometric technology, e.g., fingerprint, signature, hand geometry, face recognition, etc. They can be tuned to the specifics of a given biometric technology, e.g., in the type and amount of blackout biometric data that must be stored to perform the later evaluation or cross matching respectively. They can be tuned to the capabilities of the smart card utilized. For example, one may configure the system to store the blackout biometric data of only the last X successful authentication attempts. This way, a tradeoff between time-to-successful-replay and size of memory can be achieved. This technique can be refined in that it does not store the full biometric blackout data required to the full evaluation of cross-matches, but only a cryptographic hash (in essence, a mathematical "fingerprint") of previously successfully matched biometric data. If the mathematical function is robust enough, e.g., SHA1 or MD5, it is practically guaranteed that non-identical biometric data generate different hashes—and vice versa, that identical biometric data, i.e., replays, can be efficiently detected. The technique can be further refined to take into account possible reactions by persisting attackers who may try to alter the intercepted biometric scan so that no identity between the authentic, intercepted scan and the bogus access attempt can be determined. To this end, different distortion algorithms may be employed within the card during the cross-matching to detect such attacks.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

The invention claimed is:

1. A method for a computing device to perform authentication of a user by means of biometric data, said authentication being provided to permit or deny user access to controlled resources, the method comprising the steps of:
    receiving a biometric data set from a user;
    comparing the received biometric data set to a reference biometric data set for said user and evaluating if the received biometric data set is within a reference region, wherein the reference region represents a region associated with a reference biometric data set for said user;
    comparing the received biometric data set to a blackout biometric data set for said user and evaluating if the received biometric data set is within a blackout region, wherein the blackout region represents a region associated with at least one blackout biometric data set that was previously received and positively authenticated for said user; and
    issuing a positive authentication to allow user access to controlled resources if the received biometric data set is within the reference region, but outside the blackout region.

2. Method according to claim 1, wherein the reference biometric data set is derived from at least two previously received and positively authenticated biometric data sets.

3. Method according to claim 1, wherein a first probability threshold is set for the reference region and a second probability threshold is set for the blackout region, wherein the first probability threshold indicates the probability that a random scan of a true biometric identity is within the reference region and the second probability threshold indicates the probability that a random scan of a true biometric identity is outside the blackout region.

4. Method according to claim 1, wherein at least one of the reference biometric data set and the blackout biometric data set is represented by a selected number of characteristic parameters derived from the reference biometric data set and the blackout biometric data set respectively.

5. Method according to claim 4, wherein each parameter comprises statistics of the distribution of the reference biometric data set and the blackout biometric data set respectively.

6. Method according to claim 1, the method further comprising the steps of:
receiving a series of at least two biometric data sets which correspond to an authentication attempt of the same user;
evaluating if the received biometric data sets are within the reference region;
evaluating if the received biometric data sets are within the blackout region;
issuing a positive authentication if at least two of the received biometric data sets are within the reference region, but outside the blackout region.

7. Method according to claim 1, the method comprising the steps of:
receiving a series of m biometric data sets which correspond to an authentication attempt of the same user, wherein m is a positive integer greater or equal to 2;
evaluating if the received biometric data sets are within the reference region;
evaluating if the received biometric data sets are within the blackout region;
issuing a positive authentication if the proportion of the received biometric data sets that are within the reference region, but outside the blackout region, is above a predetermined threshold.

8. Method according to claim 6, wherein for a positive authentication the series of biometric data sets have to be received within a predetermined time.

9. Method according to claim 7, wherein for a positive authentication the series of biometric data sets have to be received within a predetermined time.

10. Method according to claim 1, wherein the blackout region comprises at least two blackout sub-regions, wherein each blackout sub-region is associated with a previously received and positively authenticated biometric data set.

11. A system for authentication of a user by means of biometric data, the system comprising:
a biometric data receiver for receiving a biometric data set from a user;
a memory device for storing reference biometric data sets corresponding to the users of the authentication system and for storing at least one blackout biometric data set for each user, wherein the blackout biometric data set is a data set of a previous and positively authenticated authentication attempt of the respective user; wherein the system is provided for
comparing the received biometric data set to a reference biometric data set for said user and evaluating if the received biometric data set is within a reference region, wherein the reference regions represent regions associated with the reference biometric data sets of the users;
comparing the received biometric data set to a blackout biometric data set for said user and evaluating if the received biometric data set is within a blackout region, wherein the blackout regions represent regions associated with the previously received and positively authenticated blackout biometric data sets of the users;
issuing a positive authentication if the received biometric data set is within one of the reference regions, but outside the corresponding blackout region.

12. A system for authentication by means of biometric data, the system comprising:
a biometric data receiver for receiving a biometric data set from a user;
an electronic token reader for reading from an electronic token a reference biometric data set and at least one blackout biometric data set of a previous and positively authenticated authentication attempt of the respective user;
wherein the system is provided for
comparing the received biometric data set to a reference biometric data set for said user and evaluating if the received biometric data set is within a reference region, wherein the reference region represents a region associated with the reference biometric data set;
comparing the received biometric data set to a blackout biometric data set for said user and evaluating if the received biometric data set is within a blackout region, wherein the blackout region represents a region associated with the blackout biometric data set; and
issuing a positive authentication if the received biometric data set is within the reference region, but outside the blackout region.

13. A system according to claim 11, wherein the electronic token reader is a smart card reader.

14. A system according to claim 12, wherein the electronic token reader is a smart card reader.

15. A system according to claim 11, characterized in that the biometric data receiver is an optical scanner.

16. A system according to claim 12, characterized in that the biometric data receiver is an optical scanner.

17. An electronic token with biometric authentication function, comprising a memory for storing a reference biometric data set and at least one blackout biometric data set of a previous authentication attempt that was positively authenticated.

18. An electronic token with biometric authentication function, comprising a memory for storing a reference biometric data set and at least one blackout biometric data set of a previous authentication attempt that was positively authenticated, the electronic token comprising:
an interface for receiving a biometric data set for authentication;
a central processing unit for
comparing the received biometric data set to a reference biometric data set for said user and evaluating if the received biometric data set is within a reference region, wherein the reference region represents a region associated with the reference biometric data set;
comparing the received biometric data set to a blackout biometric data set for said user and evaluating if the received biometric data set is within a blackout region, wherein the blackout region represents a region associated with the blackout biometric data set; and issuing a positive authentication if the received biometric data set is within the reference region, but outside the blackout region.

19. The electronic token of claim 17, wherein the electronic token is a smart card.

20. The electronic token of claim 18 wherein the electronic token is a smart card.

* * * * *